(12) United States Patent
Kato et al.

(10) Patent No.: US 7,710,312 B2
(45) Date of Patent: May 4, 2010

(54) RADAR APPARATUS AND MOUNTING STRUCTURE FOR RADAR APPARATUS

(75) Inventors: Yusuke Kato, Nisshin (JP); Akihisa Fujita, Kariya (JP); Yutaka Aoki, Nisshin (JP)

(73) Assignee: Denso Corporation, Kariya (JP)

( * ) Notice: Subject to any disclaimer, the term of this patent is extended or adjusted under 35 U.S.C. 154(b) by 39 days.

(21) Appl. No.: 12/289,011

(22) Filed: Oct. 17, 2008

(65) Prior Publication Data

US 2009/0140911 A1 Jun. 4, 2009

(30) Foreign Application Priority Data

Oct. 19, 2007 (JP) .............................. 2007-272709

(51) Int. Cl.
*G01S 7/28* (2006.01)
*G01S 13/93* (2006.01)

(52) U.S. Cl. ........................... 342/70; 342/175; 343/872

(58) Field of Classification Search ................... 342/70, 342/175; 343/872, 753, 755
See application file for complete search history.

(56) References Cited

U.S. PATENT DOCUMENTS

| | | | | |
|---|---|---|---|---|
| 4,346,774 | A * | 8/1982 | Hirota et al. ................. | 180/167 |
| 6,034,642 | A * | 3/2000 | Kojima et al. ................ | 343/753 |
| 6,160,520 | A * | 12/2000 | Muhlhauser et al. ......... | 343/755 |
| 6,249,242 | B1 * | 6/2001 | Sekine et al. ................. | 342/70 |
| 6,433,751 | B1 * | 8/2002 | Ishitobi et al. .............. | 343/753 |
| 6,496,138 | B1 * | 12/2002 | Honma ......................... | 342/70 |
| 7,148,838 | B2 * | 12/2006 | Kakishita et al. ............ | 342/70 |
| 7,528,613 | B1 * | 5/2009 | Thompson et al. .......... | 324/637 |
| 2005/0024261 | A1 * | 2/2005 | Fujita .......................... | 342/174 |
| 2009/0140911 | A1 * | 6/2009 | Kato et al. .................... | 342/70 |
| 2009/0140912 | A1 * | 6/2009 | Kato et al. .................... | 342/70 |

| | | | | |
|---|---|---|---|---|
| 2009/0146865 | A1 * | 6/2009 | Watanabe et al. ............. | 342/27 |

FOREIGN PATENT DOCUMENTS

| | | | |
|---|---|---|---|
| GB | 2169866 A | * | 7/1986 |
| JP | 61-026304 | | 2/1986 |
| JP | 2002-071788 | | 3/2002 |

(Continued)

OTHER PUBLICATIONS

"Radar Brings Vision to Cars' Blind Spots", Tim Moran. New York Times. (Late Edition (east Coast) ). New York, N.Y.; Feb. 2, 2004. p. D.13.*

(Continued)

*Primary Examiner*—John B Sotomayor
(74) *Attorney, Agent, or Firm*—Nixon & Vanderhye PC

(57) ABSTRACT

The radar apparatus includes an antenna device including a transmitting antenna and a receiving antenna, a main body which generates a radar wave, transmits the radar wave from the transmitting antenna, and receives the radar wave reflected from an obstacle to be detected by the receiving antenna, and a cover member covering the main body and the antenna device on a side of a transmission direction of the radar wave and located out of contact with the main body and the antenna device. The cover member has a transmission portion allowing the radar wave to pass therethrough, a surface of the transmission portion facing the antenna device being inclined by an angle greater than 3 degrees with respect to an antenna surface of the receiving antenna.

9 Claims, 6 Drawing Sheets

FOREIGN PATENT DOCUMENTS

| | | | |
|---|---|---|---|
| JP | 2003-240838 | | 8/2003 |
| JP | 2005049310 A | * | 2/2005 |
| JP | 2005-321325 | | 11/2005 |
| JP | 2009103457 A | * | 5/2009 |
| JP | 2009103458 A | * | 5/2009 |
| WO | WO 2006/046432 | | 5/2006 |

OTHER PUBLICATIONS

Japanese Office Action dated Jul. 21, 2009, issued in corresponding Japanese Application No. 2007-272709, with English translation.

* cited by examiner

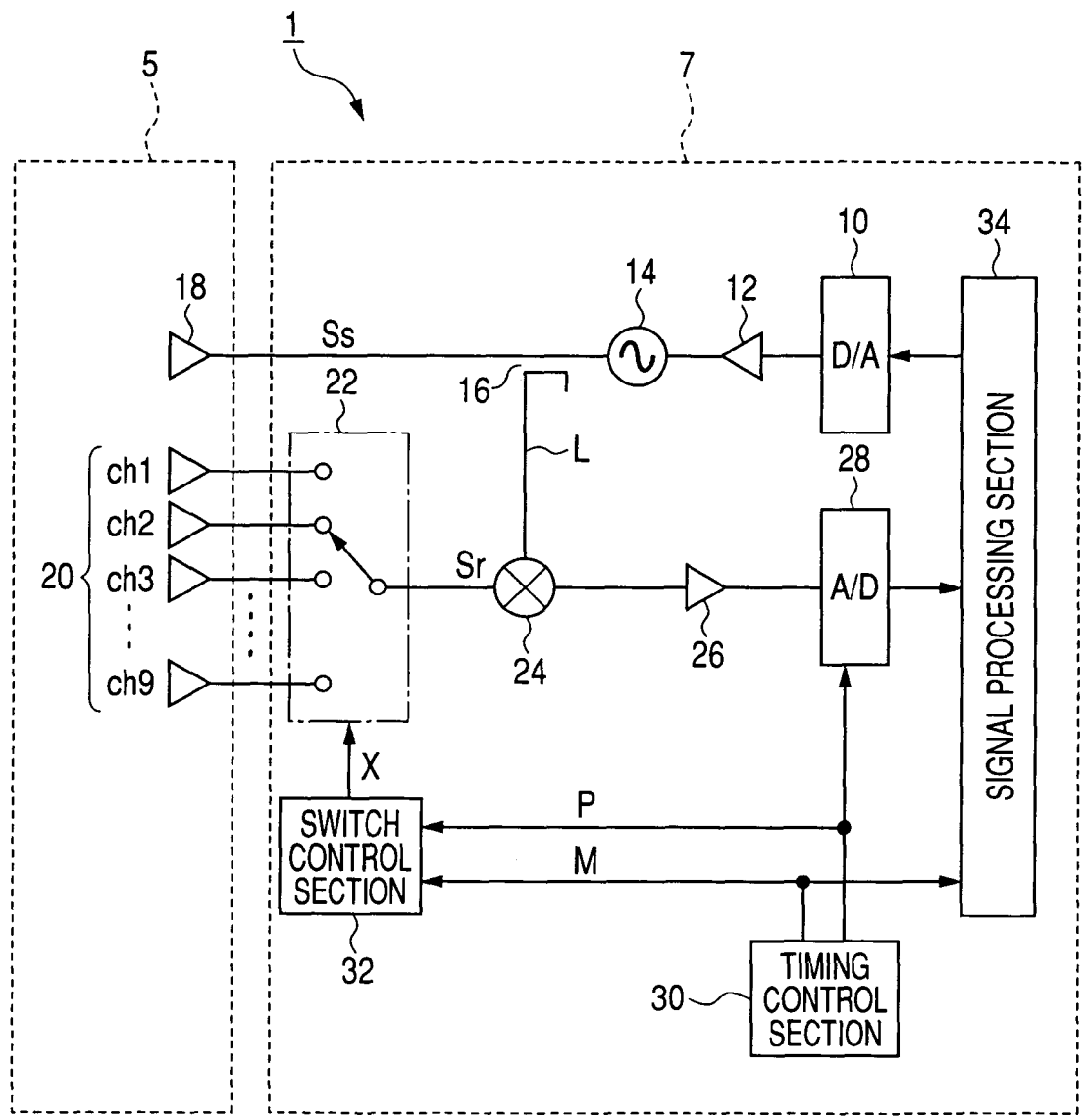

FRONT VIEW   A-A' CROSS SECTION

DIRECTIVITY OF TRANSMITTED WAVE

BUMPER MATERIAL A

BUMPER MATERIAL B

RADAR APPARATUS AND MOUNTING STRUCTURE FOR RADAR APPARATUS

CROSS-REFERENCE TO RELATED APPLICATION

This application is related to Japanese Patent Application No. 2007-272709 filed on Oct. 19, 2007, the contents of which are hereby incorporated by reference.

BACKGROUND OF THE INVENTION

1. Field of the Invention

The present invention relates to a radar apparatus, and a mounting structure for the radar apparatus.

2. Description of Related Art

As described, for example, in Japanese Patent Application Laid-open No. 2003-240838, it is known to mount a radar apparatus on the inner surface of a bumper of a vehicle so as to be covered by the bumper as a cover member.

However, when a radar apparatus is mounted on the inner surface of a bumper, there is possibility that the radar apparatus is damaged by the bumper when the bumper vibrates even slightly, or when the bumper is hit by a stone or the like.

It may occur that the radar apparatus is mounted not on the inner surface of the bumper, but fixed to a certain member located inside a vehicle body so that there is some distance between the radar apparatus and the bumper. However, in this case, since a transmitted radar wave is repeatedly reflected between the bumper and the surface of an antenna device of the radar apparatus, the detection characteristic of the reflected radar wave of the radar apparatus may become unstable, and accordingly, the obstacle detecting capability of the radar apparatus may be unstable.

SUMMARY OF THE INVENTION

The present invention provides a radar apparatus comprising:

an antenna device including a transmitting antenna and a receiving antenna;

a main body which generates a radar wave, transmits the radar wave from the transmitting antenna, and receives the radar wave reflected from an obstacle to be detected by the receiving antenna; and a cover member covering the main body and the antenna device on a side of a transmission direction of the radar wave and located out of contact with the main body and the antenna device, the cover member having a transmission portion allowing the radar wave to pass therethrough, a surface of the transmission portion facing the antenna device being inclined by an angle greater than 3 degrees with respect to an antenna surface of the receiving antenna.

The present invention also provides a radar mounting structure for mounting a radar apparatus configured to transmit a radar wave from a transmitting antenna thereof, and receive the radar wave reflected from an obstacle to be detected by a receiving antenna thereof, the radar mounting structure comprising:

a frame member to which the radar apparatus is fixed; and a cover member covering the radar apparatus on a side of a transmission direction of the radar wave and located out of contact with the radar apparatus, the cover member having a transmission portion allowing the radar wave to pass therethrough, a surface of the transmission portion facing the radar apparatus being inclined by an angle greater than 3 degrees with respect to an antenna surface of the receiving antenna.

According to the present invention, since it is possible to prevent the radar wave transmitted from a radar apparatus covered by a cover member from being repeatedly reflected between the radar apparatus and the cover member, the object (obstacle) detection performance of the radar apparatus can be stabilized in the case where the radar apparatus is covered by the cover member on the side of a transmission direction of the radar wave.

Other advantages and features of the invention will become apparent from the following description including the drawings and claims.

BRIEF DESCRIPTION OF THE DRAWINGS

In the accompanying drawings:

FIG. 1 is a block diagram showing an overall structure of a vehicle-mounted radar apparatus according to an embodiment of the invention;

PREFERRED EMBODIMENTS OF THE INVENTION

Figure 2A:
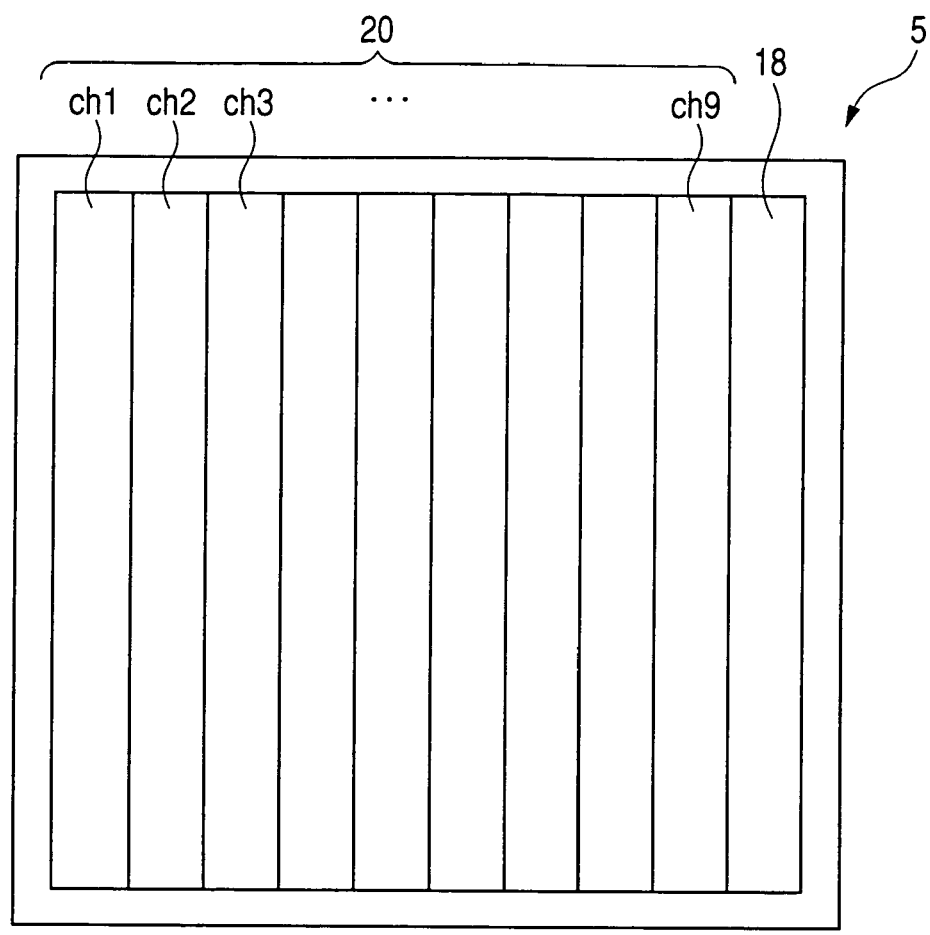
FIG. 2A is a front view of an antenna device of the vehicle-mounted radar apparatus shown in FIG. 1.

FIG. 1 is a block diagram showing an overall structure of a vehicle-mounted radar apparatus according to an embodiment of the invention. As shown in FIG. 1, the radar apparatus 1 includes a D/A converter 10, a VCO (Voltage Controlled Oscillator) 14, a distributor 16, and a transmitting antenna 18. The D/A converter 10 generates an FMCW modulation signal having a triangular waveform in accordance with a modulation command. The VCO 14, which is applied with the modulation signal generated by the D/A converter 10 through a buffer 12, generates an output whose frequency varies depending on the modulation signal. The distributor 16 splits the output of the VCO 14 into a transmit signal Ss and a local signal L. The transmitting antenna 18 emits a radar wave in accordance with the transmit signal Ss.

The radar apparatus 1 further includes a receiving antenna 20 constituted by 9 element antennas for receiving the reflected radar wave, a receiver switch 22, a mixer 24, an amplifier 26, and an A/D converter 28. The receiver switch 22 selects one of the 9 element antennas in accordance with a selection signal X, and supplies an output of the selected element antenna as a received signal Sr to the mixer 24. The mixer 24 mixes the receive signal Sr supplied from the receiver switch 22 with the local signal L to generate a beat signal B. The amplifier 26 amplifies the beat signal B generated by the mixer 24. The A/D converter 28 samples the beat signal B amplified by the amplifier 26 in accordance with a timing signal P to convert the beat signal B into digital data.

The radar apparatus 1 still further includes a timing control section 30, a switch control section 32, and a signal processing section 34. The timing control section 30 generates the timing signal P and a mode signal M. The switch control section 32 generates the selection signal X in accordance with the timing signal P and the mode signal M supplied from the timing control section 30. The signal processing section 34 outputs the modulation command to the D/A converter 10 generated in accordance with the mode signal M received from the timing control section 30, and determines a distance to a target (an obstacle) reflecting the radar wave, a relative speed with the target, a direction of the target, etc., by signal-processing the sampled digital data supplied from the A/D converter 28.

The VCO 14 generates a millimeter-wave signal in accordance with the modulation signal of triangular wave shape, the millimeter-wave signal being modulated such that the frequency thereof increases and decreases linearly with time, having a center frequency Fo of 76.5 GHz and a frequency variation width ΔF of 100 MHz.

Each of the element antennas constituting the receiving antenna 20 has a beam width (an angular range within which gain reduction with respect to the front direction does not exceed 3 dB), which contains the whole of the beam width of the transmitting antenna 18. In this embodiment, these element antennas are respectively assigned to channel 1 to channel 9.

The timing control section 30 generates the timing signal P formed of a pulse train of a cycle period of ΔT, and the mode signal M depending on control mode. The signal processing circuit 34, which is mainly constituted by a microcomputer including a CPU, a ROM, a RAM, etc., further includes an arithmetic processor (a DSP, for example) which performs FFT (Fast Fourier transform) on the data received from the A/D converter 28. The signal processing circuit 34 performs the processing to generate the modulation command at a sweep time T of Dpc×ΔT, the sweep time T being a time needed for a modulation frequency varies from a lowest value to a highest value, and vice versa, Dpc being the number of data items to be obtained.

The signal processing circuit 34 further performs the processing to determine a distance to the target, a relative speed with the target, and a direction of the target on the basis of the sampled digital data of the beat signal B supplied from the A/D converter 28.

The distributor 16 power-splits the millimeter-wave signal which the VCO 14 generates in accordance with the modulation signal, in order to generate the transmit signal Ss and the local signal L. The transmit signal Ss is emitted from the transmitting antenna 18 as the radar wave.

The radar wave transmitted from the transmitting antenna 18 and reflected from the target is received by all of the element antennas constituting the receiving antenna 20. However, the mixer 24 is supplied with the receive signal Sr only through one of the receive channels chi (i being an integer from 1 to 9), which is selected by the receive switch 22. The mixer 24 mixes the receive signal Sr with the local signal L supplied from the distributor 16 to generate the beat signal B. This beat signal. B is amplified by the amplifier 26, sampled by the A/D converter 28 in accordance with the timing signal P, and then inputted to the signal processing section 34.

Figure 2B:
FIGS. 2B and 2C are diagrams showing examples of an antenna shape.
Figure 2C:
Figure 3A:
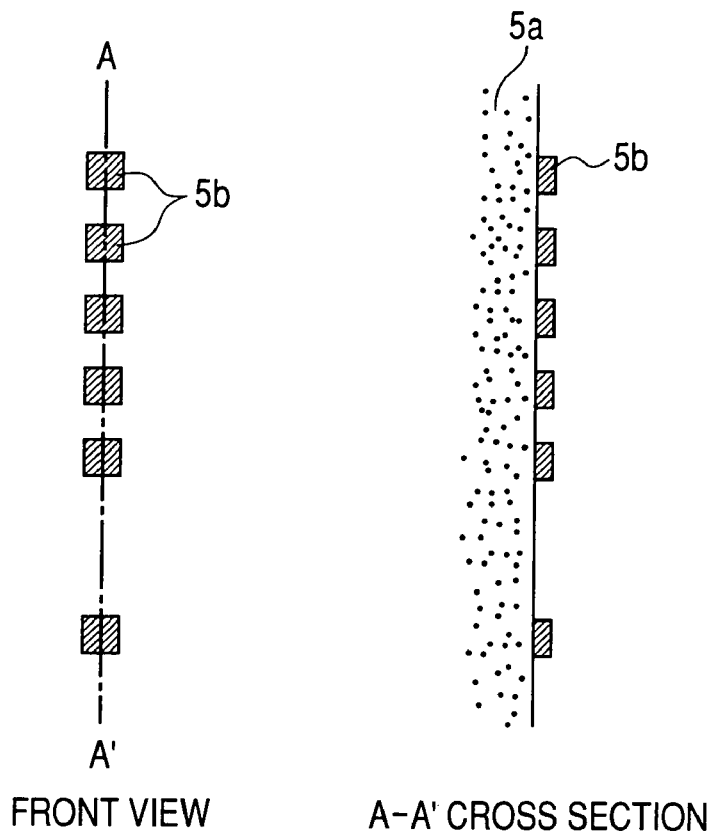
FIG. 3A is a diagram explaining the structure of an array antenna used for the antenna device.
Figure 3B:
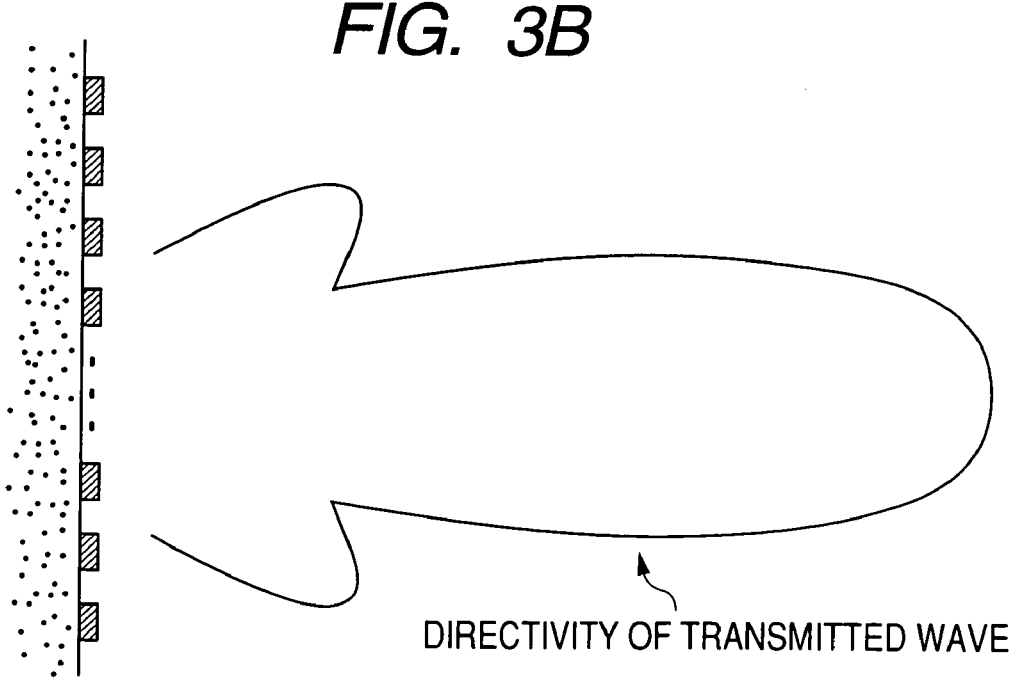
FIG. 3B is a diagram showing directivity of the array antenna.

As explained above, the radar apparatus 1 is configured to detect the reflected radar wave at the timing which overlaps the timing at which the radar wave is transmitted therefrom. Next, the structures of the transmitting antenna 18 and the receiving antenna 20 are explained with reference to FIGS. 2A to 2C and FIGS. 3A, 3B. FIG. 2A is a front view of an antenna device 5 including the transmitting antenna 18 and the receiving antenna 20. FIGS. 2B and 2C are diagrams showing examples of an antenna shape of the antenna device 5. FIG. 3A is diagram explaining the characteristic of an array antenna.

The transmitting antenna 18 and the receiving antenna 20 are located on the same plane side by side as shown in FIG. 2A so as to constitute the single antenna device 5. Each of the transmitting antenna 18 and the receiving antenna 20 is assigned a predetermined area on the antenna device 5, and operates to transmit or receive the radar wave in the assigned area.

In more detail, each of the transmitting antenna 18 and the receiving antenna 20 is assigned one of portions of a transmission area of the antenna device 5, which are equally divided in the horizontal direction (in the lateral direction of the vehicle on which the radar apparatus 1 is mounted).

As shown in FIG. 2B, each of the transmitting antenna 18 and the element antennas of the receiving antenna 20 is constituted as an array antenna in which a plurality of the antennal elements 5b are arranged in a line. The antenna element 5b, which may be a patch type element or a horn type element, has a shape appropriate to the transmission frequency. As shown in FIG. 3A, each one of the channels is constituted by a plurality of the antenna elements 5b arranged in a vertical direction (the up and down direction of the vehicle on which the radar apparatus 1 is mounted).

The receiving antenna 20 includes a plurality of such channels arranged in the horizontal direction constituting a multi-channel structure. Incidentally, each of the channels has such a characteristic that as the vertical length thereof becomes long, the horizontal directivity thereof becomes weakened, and the vertical directivity thereof becomes strong (see FIG. 3B).

Figure 4:
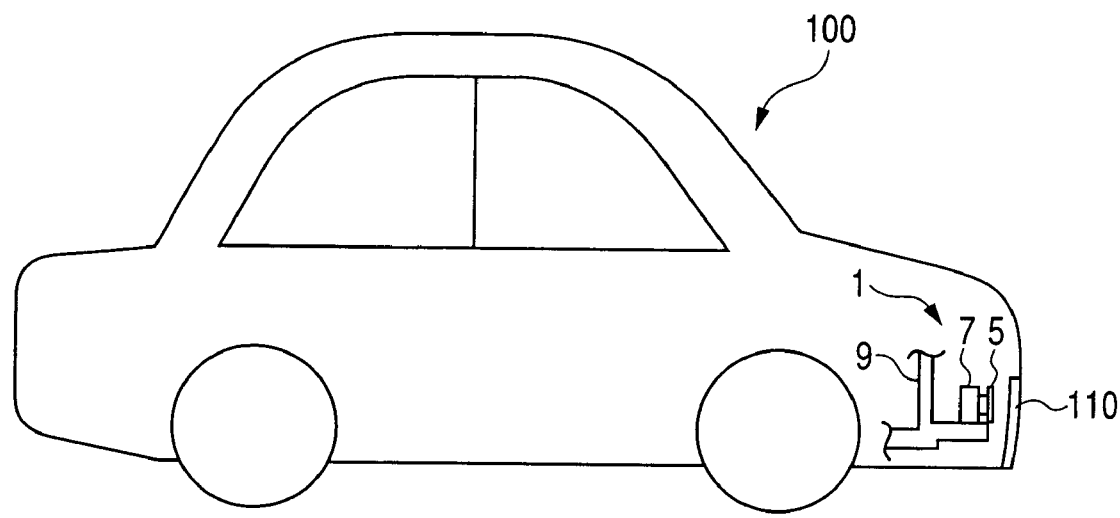
FIG. 4 is a diagram showing location of the radar apparatus mounted on a vehicle.
Figure 5:
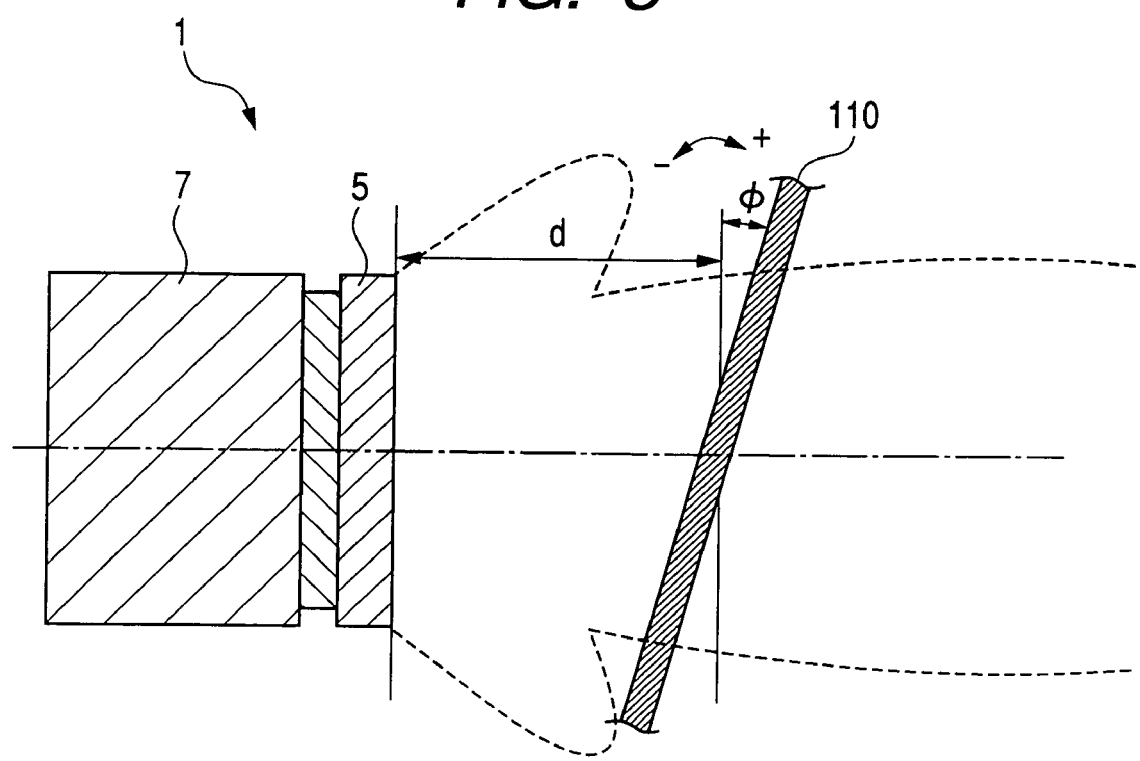
FIG. 5 is a partially enlarged diagram of FIG. 4, showing around the radar apparatus.

Next, installation of the radar apparatus 1 to a vehicle is explained with reference to FIG. 4 and FIG. 5. FIG. 4 is a diagram showing location of the radar apparatus 1 mounted on a vehicle 100. FIG. 5 is a partially enlarged diagram of FIG. 4 around the radar apparatus 1.

As shown in FIG. 4, the radar apparatus 1 is located inwardly of a front bumper 110 as a cover member of the vehicle 100. The radar apparatus 1 is mounted being covered by the bumper 110 so that it is invisible from the outside for the reason of visual design of the vehicle 100.

To increase the resistance of the radar apparatus 1 to the impact applied to the bumper 110 by a stone falling and hitting the bumper 110, the radar apparatus 1 is fixed to a radar holding member 9 which is formed as a part of the frame of the vehicle 100 so as not to be in contact with the bumper 110. As shown in FIG. 4, the radar apparatus 1 is mounted such that it faces the bumper 110 at the side of the antenna device 5, and fixed to the holding member 9 at the side of a main body 7 thereof.

Also, the radar apparatus 1 is mounted on the vehicle 100 to satisfy the condition that the distance d between the front surface of the antenna device 5 (may be referred to as "reference surface" hereinafter) and the bumper 110 along the radar center axis shown by the chain line in FIG. 5 is 12.36 mm, and the condition that the angle φ between the front surface of the antenna device 5 perpendicular to the transmission direction of the radar wave and the surface of a transmission portion of the bumper 110 (the shaded portion in FIG. 5) facing the antenna device 5 is 3 degrees.

In this embodiment, the angle φ is defined as positive when the lower portion of the bumper 110 is closer to the radar apparatus 1 than the upper portion of the radar apparatus 1, while defined as negative when the upper portion of the bumper 110 is closer to the radar apparatus 1 than the lower portion of the radar apparatus 1.

As shown in the after-described experiment results, there is no difference in the effect of suppressing the saturation of the input level of the received radar wave between when the angle φ is positive and when the angle φ is negative. Accordingly, it is possible to determine whether the angle φ should be positive or negative from the viewpoint of design of the vehicle or locations of other devices.

The reason for providing such condition of the angle φ is to make it hard for a standing wave to be developed by repeated reflection of the radar wave between the antenna device 5 and the bumper 110, even when the radar apparatus 1 is located inwardly of the bumper 110. If a standing wave is developed between the antenna device 5 and the bumper 110, the target detecting capability of the radar apparatus 1 may become unstable.

The inventors of the present application determined optimum values of the angle φ through experiment. The experiment results are explained with reference to FIG. 6A and FIG. 6B. Each of FIG. 6A and FIG. 6B is a table showing measurement results of the power loss due to the bumper for various values of the distance d and various values of the angle φ.

In this experiment, for each of different bumper materials A and B each made of resin material coated with paint, a difference in output power (power loss) when the bumper material was disposed in front of the radar apparatus 1 and when the bumper material was not disposed was measured by use of a radio field intensity meter (power meter) for various values of the distance d and the angle φ.

Figure 6A:
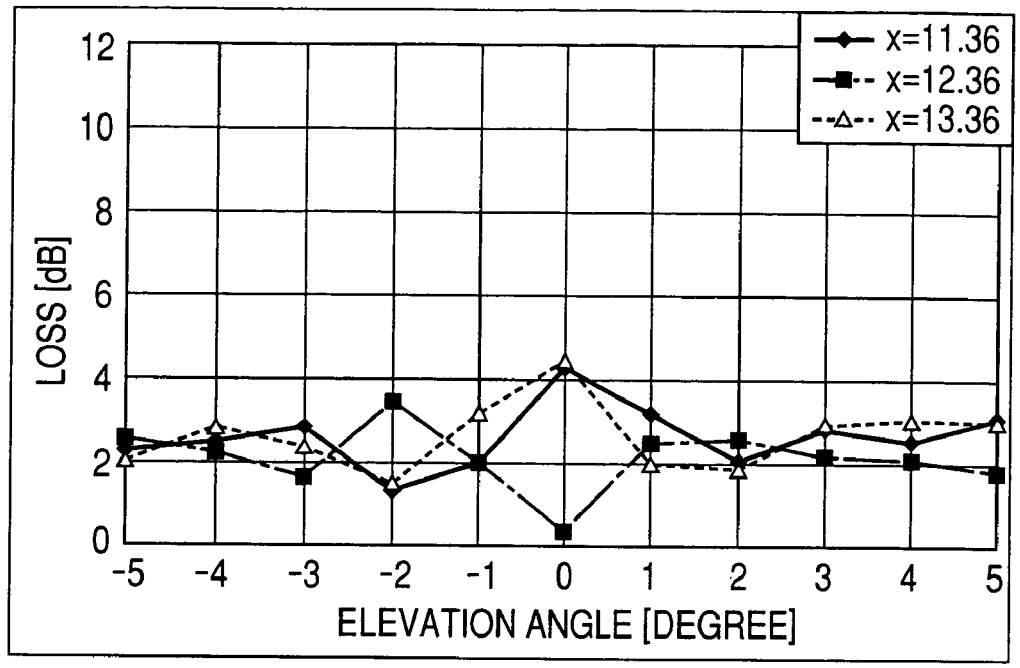
FIGS. 6A and 6B are graphs showing measurement results of power loss due to a bumper material for various values of the distance between the front surface of the antenna device and the bumper material, and various values of the angle between the front surface of the antenna device and the bumper.
Figure 6B:
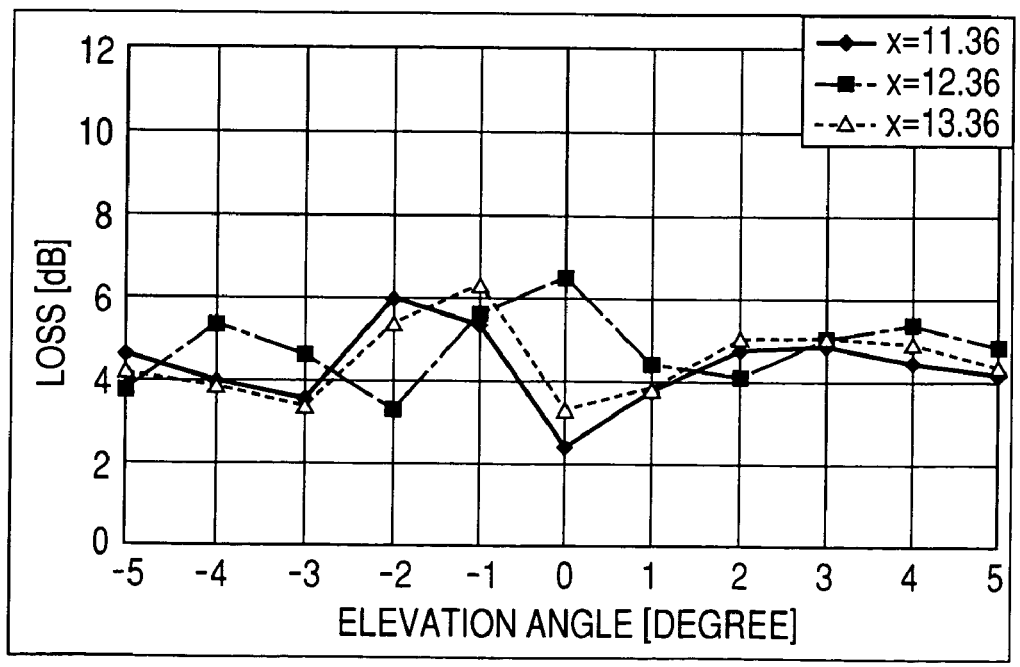

FIG. 6A shows the measurement results for the bumper material A, and FIG. 6B shows the measurement results for the bumper material B. In more detail, the output power was measured such that the distance d is set to 11.36 mm, 12.36 mm, and 13.36 mm in succession, while varying the angle φ in a range of ±5 degrees at steps of 1 degree.

As shown in FIG. 6A and FIG. 6B, when the angle φ is 0 degrees, or −2 degrees, the variation of the measured loss depending on the distance d is in a range of 2 dB to 4 dB, while on the other hand, when the angle φ is other than 0 degrees, and −2 degrees, the variation of the measured loss is within 1.5 dB.

Through the above experiment, it was confirmed that if the absolute value of the angle φ is larger than 3 degrees, the variation of the loss depending on the distance d can be suppressed, and accordingly, the received wave detecting characteristic of the radar apparatus 1 can be stabilized.

As described above, the transmitting antenna 18 and the receiving antenna 20 of the radar apparatus 1 are covered on the side of the transmission direction of the radar wave by the bumper 110, which is located out of contact with the radar apparatus 1 and has the transmission portion allowing the radar wave to transmit therethrough. This bumper 110 is tilted so that the surface of the transmission portion of the bumper 110 forms an angle greater than 3 degrees to the antenna surface of the receiving antenna 20. The radar apparatus 1 is held by the radar holding member 9.

According to this embodiment, since the surface of the transmission portion of the bumper 110 is inclined more than a predetermined angle to the antenna surface of the receiving antenna 20, it is possible to suppress the radar wave from being repeatedly reflected between the antenna surface and the bumper 110, to thereby suppress a standing wave from being developed therebetween. This makes it possible to stabilize the obstacle detecting capability of the radar apparatus 1.

Also, since the radar apparatus 1 is disposed out of contact with the bumper 110, the radar apparatus 1 is hardly affected by the vibration of the bumper 110 or impact applied to the bumper 110. The transmitting antenna 18 and the receiving antenna 20 are covered by the bumper 110 including the transmission portion having a planar shape.

This makes it possible to prevent the transmitted wave and the received wave from diffusing in unspecified directions at the transmission portion, to thereby ensure the position detecting performance of the radar apparatus 1 even in the case where the transmitting antenna 18 and the receiving antenna 20 of the radar apparatus 1 are covered by the bumper 110.

The transmitting antenna 18 and the receiving antenna 20 are covered by the bumper 110 including the transmission portion the surface of which is out of perpendicular alignment with the transmission direction of the radar wave. This makes it possible to suppress a standing wave from being developed between the antenna surface of the receiving antenna 20 and the bumper 110 even when the antenna surface is perpendicular to the transmission direction of the radar wave.

The receiving antenna 20 of the radar apparatus 1 has a shape elongated in one direction, and the radar apparatus 1 is covered by the bumper 110 having the transmission portion whose surface is inclined to the transmission direction of the transmitting antenna 10 when viewed in the direction perpendicular to the elongated direction of the receiving antenna 20 and the transmission direction.

This makes it possible to suppress a standing wave from being developed between the antenna surface and the bumper 110 even when the receiving antenna 20 has the shape elongated in one direction.

The radar apparatus 1 having the receiving antenna 20 that includes a plurality of the element antennas is so configured as to detect the reflected radar wave while switching the element antennas in succession. According to such a configuration, since the element antennas detect respectively the radar waves slightly different from one another depending on their positions, it is possible to improve the accuracy of target position detection.

The transmitting antenna 18 and the receiving antenna 20 of the radar apparatus 1 are located on the same plane. This makes it possible to simplify the antenna structure, because these antennas can be formed integrally.

Figure 7:
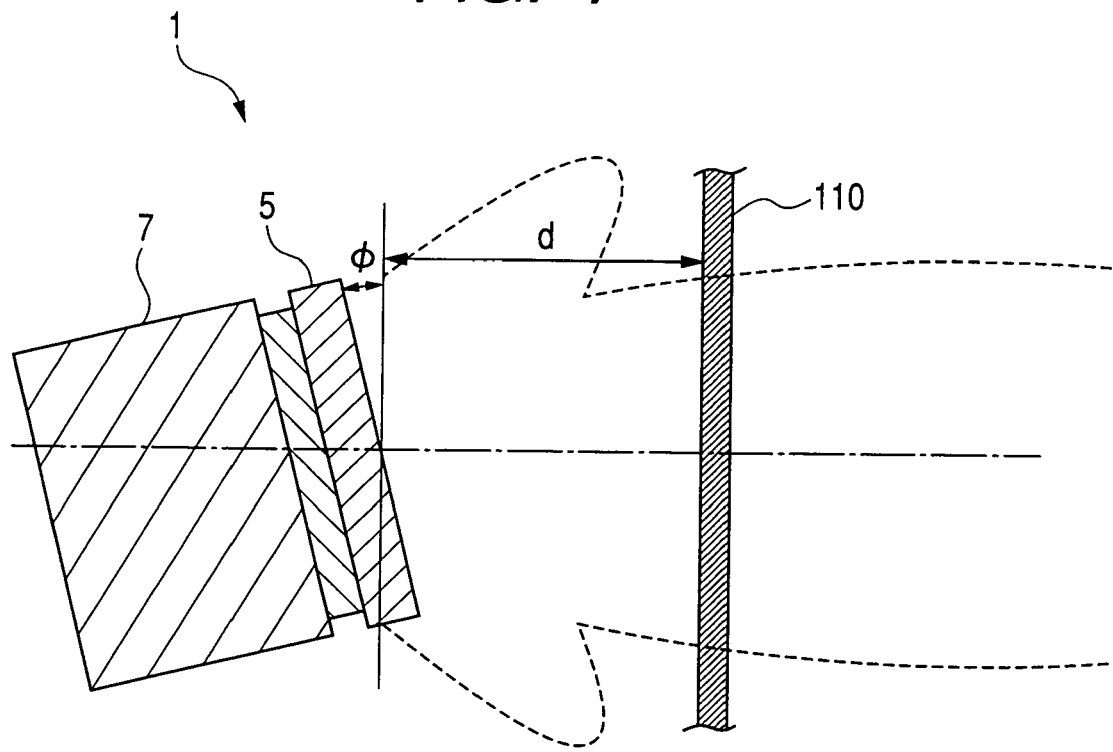
FIG. 7 is a diagram showing another location of the radar apparatus mounted on a vehicle.

It is a matter of course that various modifications can be made to the above described embodiment. For example, in the above embodiment, although the bumper 110 is tilted with respect to the transmission direction of the radar wave in order to suppress a standing wave from being developed between the antenna device 5 and the bumper 110, the bumper 110 may be un-tilted with respect to the transmission direction of the radar wave, that is, it may be perpendicular to the transmission direction of the radar wave, if the radar apparatus 1 itself is mounted tilted with respected to the transmission direction, as shown in FIG. 7.

In this case, the absolute value of the angle φ between the reference surface of the antenna device 5 and the bumper 110 is set greater than three degrees. However, in this case, the directivities of the transmitting antenna 18 and the receiving antenna 20 have to be adjusted so as to be aligned with the transmission direction.

Also according to this configuration, since the transmitted radar wave can be prevented from being repeatedly reflected between the antenna device 5 and the bumper 110, the performance of detecting the received wave of the radar apparatus 1 can be stabilized.

In the above embodiment, the positional relationship between the radar apparatus 1 and the bumper 110 (the installation angle and the distance therebetween) is optimized to reduce development of a standing wave between the radar apparatus 1 and the bumper 110. However, the structure of the bumper 110 including paint, surface treatment, material, or its thickness may be optimized to reduce development of a standing wave.

Figure 8:
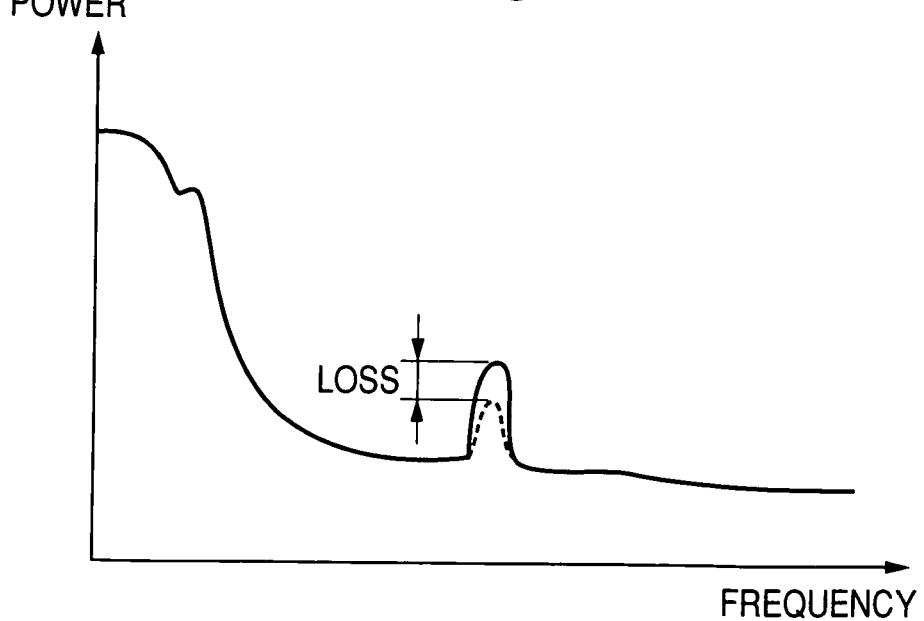
FIG. 8 is a graph showing a difference in the level of a frequency component of the received radar wave after FFT corresponding to the obstacle between when the bumper is present and when the bumper is not present.

In the above experiment, a power meter was used to measure the power loss, however, the loss can be measured by the radar apparatus 1 alone. In this case, a reflector is disposed in place of the power meter, and a difference in receive power is measured when the bumper 110 is disposed and when the bumper 110 is not disposed. Also, the loss may be measured by measuring a difference in the level of a frequency component of the received radar wave after FFT corresponding to the obstacle between when the bumper is disposed and when the bumper is not disposed (see FIG. 8).

The receiving antenna 20 may be a rectangular antenna as shown in FIG. 2C.

The above explained preferred embodiments are exemplary of the invention of the present application which is described solely by the claims appended below. It should be understood that modifications of the preferred embodiments may be made as would occur to one of skill in the art.

What is claimed is:

1. A radar apparatus comprising:
   an antenna device including a transmitting antenna and a receiving antenna;
   a main body which generates a radar wave, transmits the radar wave from the transmitting antenna, and receives the radar wave reflected from an obstacle to be detected by the receiving antenna; and
   a cover member covering the main body and the antenna device on a side of a transmission direction of the radar wave and located out of contact with the main body and the antenna device, the cover member having a transmission portion allowing the radar wave to pass therethrough, a surface of the transmission portion facing the antenna device being inclined by an angle greater than 3 degrees with respect to an antenna surface of the receiving antenna.

2. The radar apparatus according to claim 1, wherein the transmission portion has a planar shape.

3. The radar apparatus according to claim 1, wherein the cover member is disposed such that the surface of the transmission portion is out of perpendicular alignment with the transmission direction of the radar wave.

4. The radar apparatus according to claim 1, wherein the antenna device is disposed such that the antenna surface of the receiving antenna is out of perpendicular alignment with the transmission direction of the radar wave.

5. The radar apparatus according to claim 1, wherein the receiving antenna has a shape elongated in one direction, the cover member being disposed such that the surface of the transmission portion is inclined with respect to the transmission direction of the radar wave when viewed in a direction perpendicular to the transmission direction and the one direction.

6. The radar apparatus according to claim 1, wherein the receiving antenna includes a plurality of element antennas assigned to different channels, the main body of the radar apparatus being configured to receive the radar wave reflected from the obstacle through a successively selected one of the plurality of the element antennas.

7. The radar apparatus according to claim 1, wherein the radar apparatus is for vehicle use, and the cover member is a vehicle bumper.

8. The radar apparatus according to claim 1, wherein the transmitting antenna and the receiving antenna are located on the same plane.

9. A radar mounting structure for mounting a radar apparatus configured to transmit a radar wave from a transmitting antenna thereof, and receive the radar wave reflected from an obstacle to be detected by a receiving antenna thereof, the radar mounting structure comprising:
   a frame member to which the radar apparatus is fixed; and
   a cover member covering the radar apparatus on a side of a transmission direction of the radar wave and located out of contact with the radar apparatus, the cover member having a transmission portion allowing the radar wave to pass therethrough, a surface of the transmission portion facing the radar apparatus being inclined by an angle greater than 3 degrees with respect to an antenna surface of the receiving antenna.

* * * * *